April 10, 1951 — L. N. FRANKLIN — 2,548,008
DISK BRAKE CONSTRUCTION
Filed June 23, 1947 — 2 Sheets-Sheet 1

L. N. Franklin
INVENTOR

Patented Apr. 10, 1951

2,548,008

UNITED STATES PATENT OFFICE 2,548,008

DISK BRAKE CONSTRUCTION

Loomis N. Franklin, Madisonville, Ky.

Application June 23, 1947, Serial No. 756,433

1 Claim. (Cl. 188—72)

This invention relates to brakes, and more particularly to fluid-operated brakes wherein movable brake discs are provided, the movable brake discs being moved into engagement with the braking disc, by means of fluid-operated pistons moving against the movable discs.

An important object of the invention is to provide a disc brake which will be exceptionally sensitive and easily operated with the minimum amount of exertion on the part of the operator.

Still another object of the invention is to provide a brake wherein the braking will not occur too suddenly, to cause an objectionable sudden stopping of the vehicle, under normal application of the brakes.

With the foregoing and other objects in view which will appear as the description proceeds, the invention consists of certain novel details of construction and combinations of parts, hereinafter more fully described and pointed out in the claim, it being understood that changes may be made in the construction and arrangement of parts without departing from the spirit of the invention as claimed.

Referring to the drawings.

Figures 1, 2:
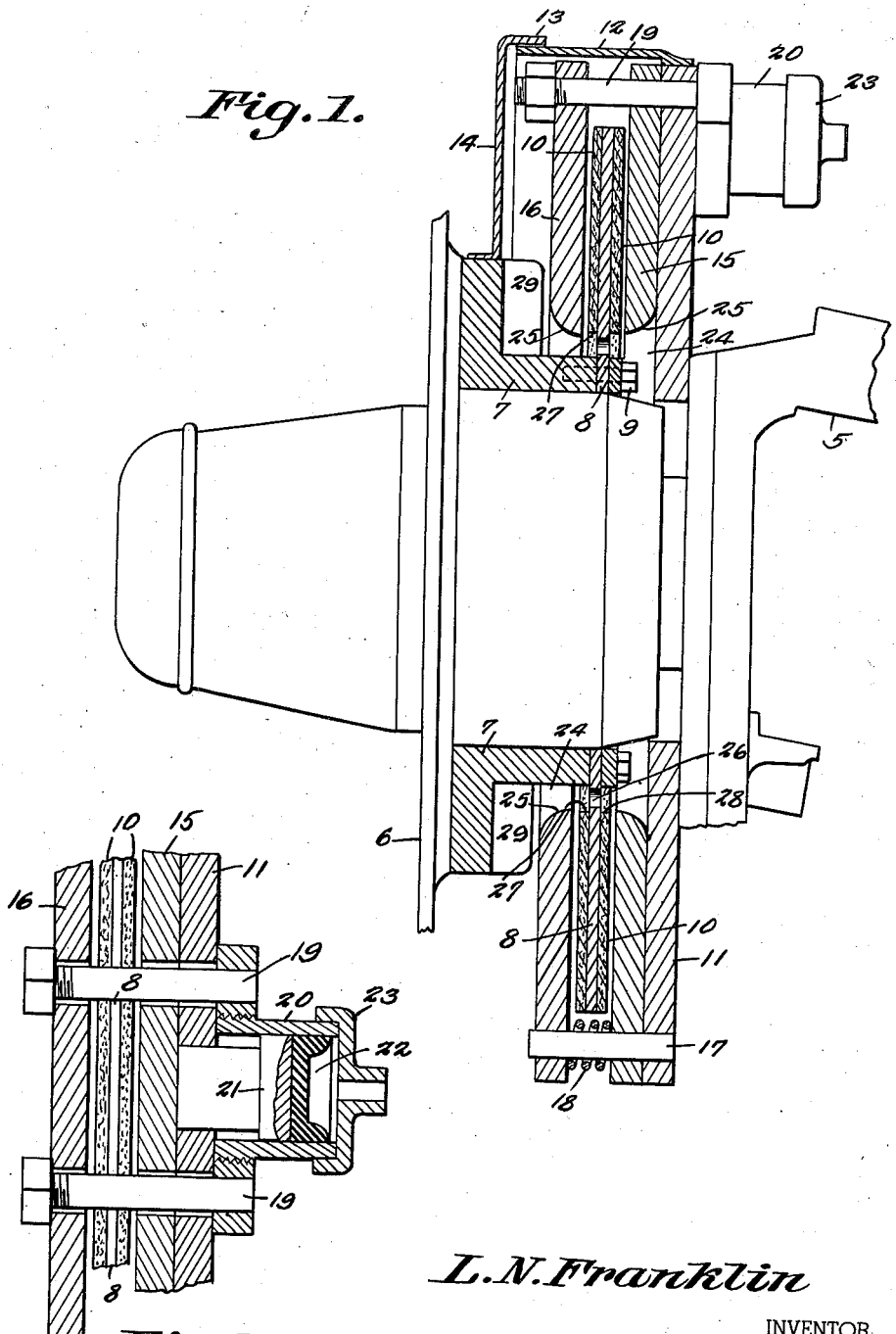
Figure 1 is a vertical sectional view through a brake and hub of a wheel, equipped with the brake.
Figure 2 is a sectional view taken on line 2—2 of Figure 3.
Figure 3:
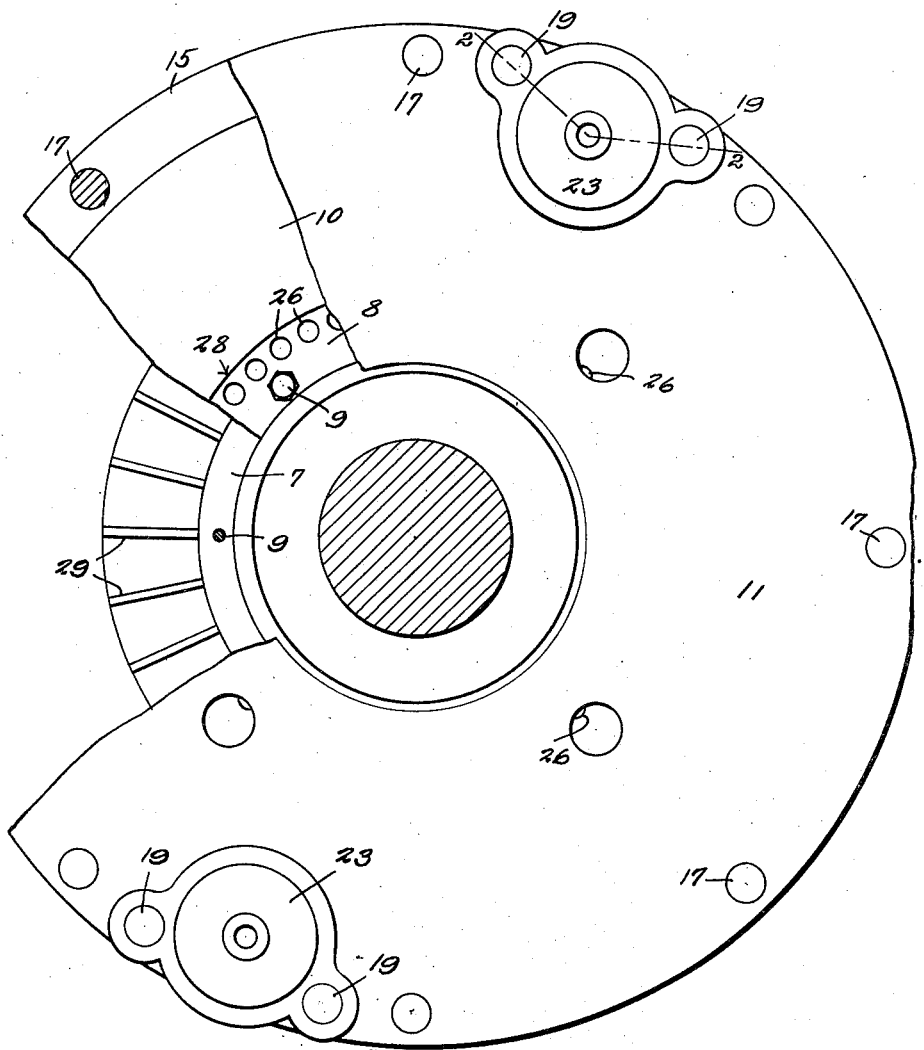
Figure 3 is an elevational view illustrating the rear plate of the brake housing as partially broken away illustrating the interior working elements of the brake.

Referring to the drawings in detail, the reference character 5 indicates an axle of a vehicle, on which the wheel 6 is mounted, the wheel embodying the hub 7 to which the brake disc 8 is secured, as by means of the bolts 9, the brake disc having its opposite faces supplied with brake shoe lining material 10.

The reference character 11 indicates the inner supporting disc secured to the axle of the vehicle and forming the stationary part of the brake housing, to which the annular casing 12 is connected, the casing 12 telescoping within the inwardly turned annular flange 13 of the disc 14 that is secured to the hub of the wheel, as clearly shown by Figure 1 of the drawings.

The annular casing 12 and disc 14 cooperate in providing a housing for the brake discs 15 and 16 which are formed with central openings to accommodate the hub of the wheel. The brake discs 15 and 16 are provided with openings for the reception of the dowel pins 17 that are secured to the inner supporting disc 11, the openings of the brake discs being sufficiently large to permit the brake discs to move thereover. Coiled springs such as indicated at 18 are disposed on the dowel pins 17 and bear against the inner surfaces of the discs 15 and 16, moving the discs away from each other under normal conditions.

Bolts 19 are also provided for securing the brake discs together in proper operating positions with respect to each other. Mounted on the inner supporting disc 11, are cylinders 20 in which the pistons 21 operate, the pistons 21 having their inner ends engaging the disc 15 to urge the disc 15 towards the brake disc 8. As this movement takes place, it will, of course, be understood that the brake disc 16 is simultaneously moved into engagement with the brake disc 8, braking the action of the wheel supplied with the brake.

A cup washer indicated at 22 is fitted within the cylinder and engages the piston to provide a fluid-type connection between the piston and its cylinder. It will, of course, be understood that two of these cylinders are provided as a part of each brake structure, so that the brake discs will be applied evenly.

Each of the cylinders 20 is provided with a cover 23, the covers being formed with openings through which pipes not shown, and leading from a fluid cylinder, are connected. This pipe line system may be of the conventional type now commonly used in connection with fluid brakes, without departing from the spirit of the invention.

In the operation of the brake, fluid is directed to the cylinders 20, whereupon the pistons 21 are moved inwardly, causing the brake discs 15 and 16 to move towards each other, clamping the brake disc 8, therebetween.

Since the brake disc is carried by the hub of the wheel, and rotates therewith, it is obvious that the braking action will take place to retard the rotary movement of the wheel.

It might be further stated that all of the wheels of a vehicle are supplied with braking mechanisms as described, and all of the brakes are in communication with pipe lines leading from a fluid cylinder, so that all of the brakes will be simultaneously applied.

As the pressure is relieved on the cylinders, it is obvious that the springs 18 will operate to separate the brake discs 15 and 16 to the end that they will be normally held in position for application of the brake.

It might be further stated that the brake discs 15 and 16 are provided with substantially large openings 24 that are formed with curved walls 25, the openings 24 being of such a size that they fall opposite to the circular line of openings 26 formed in the brake disc 8, the openings 26 being opposite to the openings 27 and 28 formed in the brake shoe lining material or lining discs 10, with the result that air is admitted and circulated through the openings 24, 26, 27 and 28, maintaining the brake discs cool at all times.

Fan blades 29 are formed on the inner end of the hub 7, and are so arranged that they will draw air through the openings to insure the cooling of the brake discs.

What is claimed is:

A braking mechanism for wheels, comprising in combination, an axle, a wheel mounted for rotation on the axle, a central brake discs secured to the wheel and having a circular line of ventilating openings adjacent to the hub thereof, a brake housing including a disc, outer brake discs disposed on opposite sides of the central disc and normally held in spaced relation therewith, said outer brake discs extending beyond the periphery of the central brake disc, said outer brake discs having alining openings disposed beyond the periphery of the central brake disc, bolts extending through the alining openings connecting the outer brake discs, cylinders mounted externally of the housing, means for connecting the bolts to the cylinders, pistons operating within the cylinders, said pistons extending through openings in the housing and engaging one of the outer brake discs, means for admitting fluid under pressure to said cylinders, operating the pistons, moving the brake discs into gripping relation with the central brake disc, pins extending through the housing and outer brake discs connecting the outer brake discs, and springs mounted on said pins in contact with the outer brake discs, normally urging said outer brake discs apart.

LOOMIS N. FRANKLIN.

REFERENCES CITED

The following references are of record in the file of this patent:

UNITED STATES PATENTS

| Number | Name | Date |
|---|---|---|
| 1,731,416 | Gurney | Oct. 15, 1929 |
| 1,875,095 | Milan | Aug. 30, 1932 |
| 1,979,181 | Wenner | Oct. 30, 1934 |
| 2,044,989 | Le Brie | June 23, 1936 |
| 2,105,867 | Stewart | Jan. 18, 1938 |
| 2,107,954 | Morton et al. | Feb. 8, 1938 |
| 2,174,635 | Linderman | Oct. 3, 1939 |
| 2,210,416 | Kiep et al. | Aug. 6, 1940 |
| 2,304,774 | Ash | Dec. 15, 1942 |
| 2,317,599 | Freer | Apr. 27, 1943 |
| 2,351,041 | Hawley | June 13, 1944 |
| 2,417,854 | Barish | Mar. 25, 1947 |